United States Patent [19]
Loos

[11] Patent Number: 5,442,818
[45] Date of Patent: Aug. 22, 1995

[54] INNER LINING AND PROCESS FOR MAKING IT

[76] Inventor: Paul Loos, Bruckhofstrasse 5, A-4600 Thalheim b. Wels, Austria

[21] Appl. No.: 119,250
[22] PCT Filed: Dec. 18, 1991
[86] PCT No.: PCT/EP91/02443
§ 371 Date: Sep. 27, 1993
§ 102(e) Date: Sep. 27, 1993
[87] PCT Pub. No.: WO92/17332
PCT Pub. Date: Oct. 15, 1992

[30] Foreign Application Priority Data

Mar. 27, 1991 [CH] Switzerland ............... 929/91

[51] Int. Cl.⁶ ..................................... A41D 27/02
[52] U.S. Cl. ................................. 2/272; 2/275; 2/164; 2/169
[58] Field of Search .............. 2/272, 164, 97, 169, 2/275, 243.1, 69, 69.5, 82, 87, 165–167; 5/413, 417, 484, 502, 482; 428/57, 58, 102, 104, 286, 284

[56] References Cited

U.S. PATENT DOCUMENTS

| | | | |
|---|---|---|---|
| 1,280,421 | 10/1918 | Diem | 2/164 |
| 1,423,546 | 7/1922 | Speer | 2/164 |
| 3,114,915 | 12/1963 | Gross | 2/164 |
| 3,548,413 | 12/1970 | Jackson | 2/164 |
| 4,430,759 | 2/1984 | Jackrel | 2/164 |
| 4,569,874 | 2/1986 | Kuznetz | 2/272 |
| 4,583,247 | 4/1986 | Fingerhut et al. | 2/272 |
| 4,860,386 | 8/1989 | Martin | 2/272 |
| 4,868,928 | 9/1989 | Norvell | 2/272 |
| 5,020,161 | 6/1991 | Lewis, Jr. et al. | 2/164 |
| 5,335,372 | 8/1994 | Wiedner et al. | 2/272 |

FOREIGN PATENT DOCUMENTS

WO89/07523  8/1989  United Kingdom .

*Primary Examiner*—Clifford D. Crowder
*Assistant Examiner*—Amy B. Vanatta
*Attorney, Agent, or Firm*—Oliff & Berridge

[57] ABSTRACT

An inner lining for an item of equipment used at least temporarily to cover parts of the body includes at least one layer of cut sections, at least one textile material (2) and at least one semipermeable membrane (1), attached together on joining lines. The individual layers are thereby assembled over their entire areas in a non-slip and semipermeable manner. The joining lines (8a) of the membrane parts (1', 1'') are welded, while those (8b) of the parts (2', 2'') of a first textile material are joined independently of the membrane (1), preferably by sewing.

25 Claims, 1 Drawing Sheet

U.S. Patent <span style="float:right">Aug. 22, 1995</span> <span style="float:right">5,442,818</span>
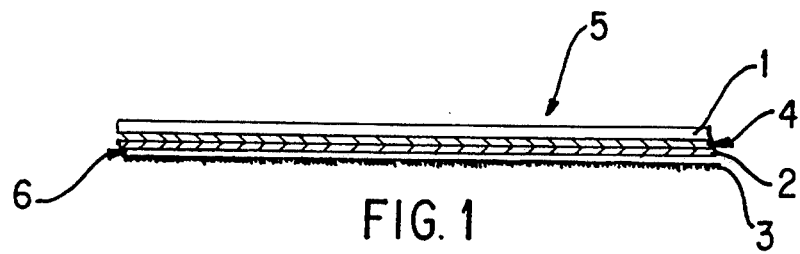
FIG. 1
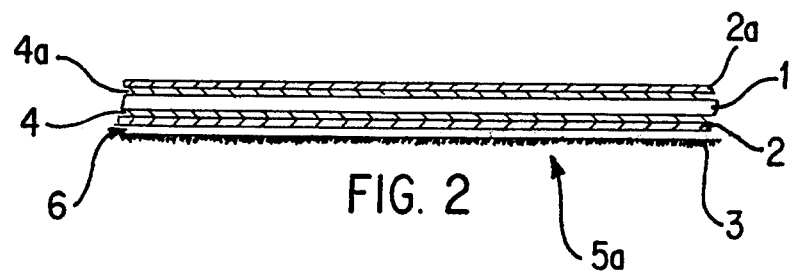
FIG. 2
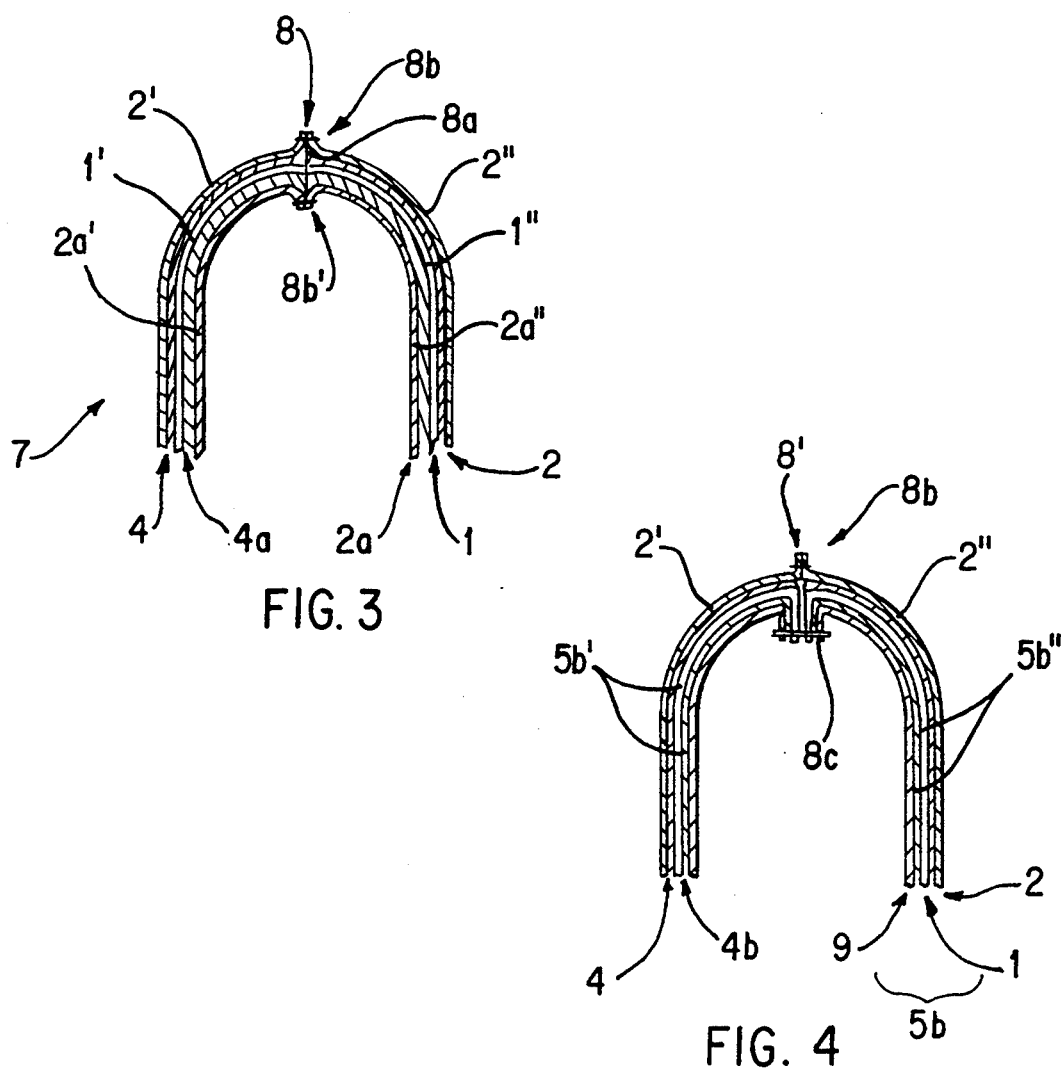
FIG. 3
FIG. 4

INNER LINING AND PROCESS FOR MAKING IT

BACKGROUND OF THE INVENTION

1. Field of the Invention

The invention relates to an inner lining and to a method of manufacturing an inner lining for an item of equipment for at least temporary covering of parts of the body, such as an item of clothing, coverlet, or sleeping bag; the lining is made of cut parts, joined at connecting lines, wherein each of the cut parts has of at least one textile layer and at least one semipermeable membrane layer with the textile and semipermeable material layers being joined together in a slip-proof and semipermeable fashion.

2. Description of Related Art

Combinations of textile materials with semipermeable membranes are used in many ways for a wide variety of different applications. The use of semipermeable membranes is advantageous, especially when working out of doors, playing certain sports, and in leisure activities; their property of allowing perspiration to pass through but not rainwater is extremely desirable, especially for articles of clothing.

Consequently, athletic, work, and leisure clothing is made using such membranes, with these relatively thin membranes generally being part of inner linings together with other lining materials. These other lining materials, which can be textiles of a wide variety of different types, in contrast to the semipermeable membrane, are essentially water-permeable. They serve as an intermediate layer against the body or also against the covering outer material. The advantageous effect of the semipermeable membrane must be reduced only slightly if at all by the textile materials.

Because of the different properties of the membrane and the textile material, their common processing poses problems, and the wearing comfort of articles of clothing provided with them is not always optimal. Using the example of ski gloves, in which semipermeable membranes are used as a component of the inner lining together with other, especially heat-insulating, textile linings, the disadvantages of conventionally equipped articles and advantages of those provided with the lining material according to the invention are readily apparent.

The individual cut parts for the glove lining are cut to size both for the membrane and for the textile lining and must be fitted together. Since the glove inner lining would become permeable at the seams when the membrane cut parts were sewn together, the latter must be glued or welded, or at least, after sewing them together, the seams must be covered with a sealant. The cut parts made of textile lining on the other hand are sewn together in the usual way. The two lining layers thus obtained, made of textile material and membrane, are then sewn together onto the outer material of the glove. The textile material lining which retains the heat and faces the hand, and tends to adhere to the hand, which is always slightly moist, when the glove is pulled off and simultaneously turned inside out, is easily pulled out of the glove, especially since the membrane located between the material lining and the glove outer material has a smooth surface that is dry because of its water-repellent property. For this reason, for example in known glove linings, the material and membrane linings are connected together at certain points using special membrane tabs. This is intended to prevent the membrane and the material lining from separating from one another when the glove is pulled off. This requires additional tailoring work and complicated sewing to make the lining, since, as has already been stated, the membrane parts must not be pierced and therefore must not be sewn through. But this connection between the membrane and the material lining does not prevent the lining, possibly in its entirety, from being pulled out of the glove, because the membrane lining slides smoothly in the glove. This is very unpleasant in sports, since the inner lining must be pushed back correctly into the glove with damp or moist fingers, which is very difficult.

W0 89/07523 shows how semipermeable membranes in particular, with expandable, especially knitted or woven, textile materials are joined on one or two sides to make inner linings for gloves and socks for example, as well as gloves and socks themselves. Such gloves or socks are intended to have special wearing comfort with regard to water repellency and heat insulation, attributable to complete elimination of perforations of the membrane and to the curling that takes place during manufacture, forming tiny air chambers. However, the manufacture of such gloves or socks or their inner linings is limited to the use of finished knitted and/or crocheted glove or sock textile layers that can be stretched and coated with membrane layer parts and partially glued together over large areas, with the membrane layer parts being welded together at their overlapping points. Another textile layer can be applied to the other side of the membrane layer only, by again stretching the membrane-textile layer and the additional textile layer and by similar gluing, or fastened in the manner described above using loop-like projections.

Articles of clothing for which other than stretchable, i.e. knitted or crocheted in particular textile materials, are to be used cannot be provided with an inner lining containing a semipermeable membrane in the manner described in W0 89/07523. This type of manufacture is equally unsuited for articles of clothing that are complicated from the tailoring standpoint, with stress being placed on a good fit corresponding to ready-to-wear sizes. It is to be expected that an article of clothing or its inner lining made in this fashion, i.e. stretching—(hot) gluing—shrinking and possibly stretching again (hot) gluing—shrinking, will only meet this requirement to a limited degree.

SUMMARY OF THE INVENTION

The invention however has set the goal of providing an inner lining in which the disadvantages described above are avoided. This is accomplished by providing an inner lining structure in which the semipermeable membrane layer and the textile material layer of each cut part are joined to each other in a slip-proof and semipermeable manner over substantially their entire common surfaces, and connecting lines between the semipermeable membrane layers of adjacent cut parts are welded, while connecting lines between the textile material layers of adjacent cut parts are joined together independently of the membrane layers, preferably by sewing.

For inner linings of articles of clothing, for example gloves, in which a plurality of cut parts must be connected with one another, the cut parts of the membrane lining layer can be connected together in known fashion, for example by welding, while the cut parts of the material layer can be sewn together in the normal labor-saving way. These two lining layers, joined to one another semipermeably over their entire common surface, adhere to one another without slipping, and the inner lining as a whole possesses the desirable properties of the membrane layer itself.

Alternatively, although more labor-intensive, the membrane and textile material layers are initially joined over their entire surfaces in a slip-free and semipermeable fashion, then cut into the required parts and fitted together in the desired shape, for example by sewing, whereupon these connecting lines are welded or sealed afterward to seal off any perforations in the membrane. Another textile layer consisting of cut parts joined to match each other mirror-image-wise, preferably sewn together, is then joined over the entire common area with the other side of the membrane in a slip-proof manner and semipermeably. This somewhat more expensive manufacturing method can also be advantageous for certain articles of clothing, for example those that require especially strong seams. In addition, already prefabricated layer material composed of a membrane and at least one textile material layer joined to it on one side, may be employed.

If the membrane lining layer is joined on both sides to a material lining layer in the manner according to the invention, an article of clothing provided with such an inner lining is characterized by special wearing comfort. The disadvantages described above relative to a glove with a conventional inner lining are avoided.

If the membrane layer is joined on both of its surfaces with a textile material layer, the inner lining in its totality possesses the desired properties of the membrane, but also acts as a single textile material, possibly with different surfaces. Thus, a fleece can be provided on one side of the membrane layer and a heat-insulating fiber fur on the other side. If the inner lining composed of a textile material and a semipermeable membrane layer are connected on one or both sides with another textile material or another membrane layer, inner linings are possible that allow a combination of different properties that can be associated with textile materials or with different membranes, whereby each of these layers, whether fabric or a membrane layer, consists of cut parts joined together. The respective type of connection can be completely independent in each case of the other layer, and can be adjusted to the quality of the respective material.

The flush joining of the various layers to one another also results in a certain stiffening and hence in an increase in dimensional stability, which is advantageous for certain applications as a lining.

The requirement, contradictory in itself, for flush slip-proof joining of the membrane layer with the textile material layer, with simultaneous retention of the semipermeable quality of the layer material as well, is met by using an adhesive material to attach the membrane layer to the textile material layer in a slip-proof and semipermeable manner. The adhesive material is preferably uniformly distributed over the entire joining surface of the two layers. The adhesive material can be applied for example in the form of a plurality of dots.

To join the individual layers, the adhesive is applied to the individual layers before processing. In this respect, an activatable adhesive is especially advantageous, since this does not interfere with the work step. The processed layers, consisting of cut and fitted cut parts, can be arranged flush with one another and aligned. The adhesive is then activated only later, for example by heat or pressure, with the individual layers, whether already processed or not (as in the somewhat more labor-intensive alternative described above), being joined together in the desired fashion.

If a plurality of layers of textile materials and/or membranes are joined together in a manner according to the invention, the textile layers can be joined together in known fashion by laminating, for example by flame bonding. It is important to note however that the properties of the semipermeable membrane are not negatively affected by the type of lamination. Thus, even in the joining of textile fabric layers with one another, it is important to note that the joining means, for example the adhesive, are uniformly distributed between the membrane and fabric layers, but are applied only partially or even semipermeably to the respective layers.

The adhesive, activatable or immediately adhesive, can also be applied however only after processing, for example during the fitting together of cut parts, for example by spraying.

If an inner lining according to the invention is characterized by the above-mentioned advantages, for example a good, generally slip-proof, seat in the outer sheath, this can be improved even further when this outer sheath is additionally connected to the inner lining in a manner similar to that described above, possibly by activatable adhesives. If the material involved in the outer sheath is leather for example, this is preferably not joined with the membrane layer of the inner lining but with the outer of two textile layers receiving the membrane layer between them.

BRIEF DESCRIPTION OF THE DRAWINGS

The invention will now be described with reference to the drawings.

FIG. 1 is a section through a layer material with a membrane and a textile material layer;

FIG. 2 is a section through a layer material with a plurality of layers, especially of textile materials;

FIG. 3 is a section through an inner lining according to the invention, with joining lines of the cut parts of the membrane and the textile material; and FIG. 4 is a section corresponding to FIG. 3 through an inner lining version made differently.

DETAILED DESCRIPTION OF PREFERRED EMBODIMENTS

The membrane and material layer, whether processed or not, are designated in the following description by reference numerals, with same but differently arranged layers differing only their letter designations. Cut parts of these material or membrane layers include a prime (').

FIG. 1 shows a layer material 5 consisting of a membrane layer 1 and a textile material layer 2, 3.

Membrane 1 consists of semipermeable material which, for athletic clothing purposes for example, although it is permeable to perspiration, is water-impermeable or water-repellent. Textile material layer 2, 3 here consists of two material layers, a first material layer 2 and another material layer 3. First material layer 2 consists for example of thin nonwoven material that warps slightly and thus serves as a "seam aid" when the two textile material layers 2, 3 are processed. The other material layer 3, made of brushed velour for example, is joined with first material layer 2, the nonwoven fabric, by slight lamination 6. The two textile material layers 2, 3 are joined to membrane 1 by contacting a surface (initially free, at the top in FIG. 1) of layer 2, 3 with membrane 1 by an adhesive layer 4, applied in the form of a plurality of dots on textile material layer 2, 3 and/or membrane layer 1. The manner of application of adhesive layer 4 is important to ensure that the permeability of membrane 1 is preserved as well for layer material 5 as a whole.

Adhesive layer 4 can be instantly adhesive for a layer material 5, to be processed further in webs, for example for sleeping bag inner linings, so that when the two textile material layers 2 and 3 are laminated, joining to membrane I can also take place in the same work step. However, in glove linings for example, more expensive processing steps are required, with cut parts to be joined together in many different ways, and an adhesive layer 4 that requires activation is preferable.

Adhesive layer 4 can be applied either to first textile layer 2 or to membrane layer 1, but application to textile layer 2 is preferable, since it can be done in the same work step as the provision of a joining material 6. This joining material 6 and adhesive layer 4 can be applied in the same way, in the form of strips or a grid, or in the form of a plurality of dots.

Joining material 6 can be a laminating material or an adhesive layer, applied as described above. If it is applied over the entire surface it is important that it have a permeable or a semipermeable effect like that of the membrane itself. A partial joining by means of fibers, like that effected for example in flame bonding, is possible.

FIG. 2 shows a layer material 5a made up of a plurality of layers. Membrane layer 1 in this case is joined on both sides by adhesive layers 4 and 4a with textile material layers 2, 3, and 2a. Since membrane 1 is covered on both sides over its area by material layers and the connection to individual layers 1, 2, 3, and 2a is slip-proof, layer material 5a in its totality acts in the same way as a textile material having the properties of membrane 1, which is located therein.

FIG. 3 shows a partial section through an inner lining according to the invention, namely through fingertip 7 of a glove lining. Membrane 1 is cut into required cut parts 1' and 1", and textile material layers 2 and 2a are cut into necessary cut parts 2' and 2" and 2a' and 2a".

Parts 1' and 1" are then joined together in known fashion, for example by forming a welded joining line 8a. Membrane 1 is undamaged as a result, since it is not pierced as it would be during sewing, and the membrane lining layer is therefore reliably semipermeable as a whole. Cut parts 2' and 2" as well as 2I' and 2a" are sewn together in the usual fashion along joining line 8, thus forming the two material lining layers 2 and 2a. Then the resultant individual lining layers 1, 2, and 2a are arranged on top of one another so that they overlap one another and are correctly aligned, preferably slipped over a model of a hand, and heated externally and/or internally by means of a heatable hand model, so that adhesive layers 4 and 4a between membrane lining layer 1 and material lining layers 2 and 2a are activated. All three lining layers 1, 2 and 2a then form a single lining layer with a semipermeable property and textile quality.

In order to ensure the best possible adhesive bond with membrane lining layer 1 at joining lines 8, in the manner described in FIG. 3, seams 8b and 8b' on the two material lining layers 2 and 2a should be located so that they face away from membrane lining layer 1. Accordingly care must be taken when cutting the material lining parts corresponding to them to be sure that they are cut to match one another mirror-image-wise.

FIG. 4 shows an alternative to this inner lining in which membrane 1 and textile material layers 2 and 2a are not, unlike FIG. 3, cut independently of one another into required cut parts 1' and 1", 2' and 2", and 2a' and 2a". In this case, the point of departure is a layer material 5b corresponding to FIG. 1, in which a membrane 1 and at least one second textile material layer 9 are joined together by an adhesive material 4b in the manner described above, semipermeably over their entire surface. This layer material 5b is then cut into required cut parts 5b' and 5b" and fitted together along joining line 8c, by sewing for example. Since this can result in perforations in membrane 1, thereby reducing its semipermeability, these joining lines 8c must be additionally welded or sealed. Textile material layer 2 however, possibly jointly with a similar textile layer, laminated for example, is cut into cut parts 2' and 2", joined together at connecting line 8b, by sewing for example. Seam 8b then advantageously faces outward, away from membrane 1, so that when the two inner lining layers 5b and 2 are joined by adhesive 4, reliable adhesion with a simultaneous guarantee of semipermeability of the inner lining as a whole at connecting line 8', common to all the cut layer parts, is guaranteed.

The finished lining is then inserted for example into the glove.

In the inner linings shown in FIGS. 3 and 4, if textile material layer 2 comes in contact with the inside of the glove, so that when the glove is pulled off this simultaneous pulling out of the inner lining is made considerably more difficult, this is rendered impossible by an adhesive layer additionally applied in the manner described to textile layer 2, said adhesive layer firmly joining the outer glove and the inner lining, for example after activation.

There is wide room for maneuver in the selection and composition of the individual textile lining layers, which can also be combined with one another, as described with reference to FIG. 2.

Another possible application consists in the fact that such an inner lining can consist of a plurality of layers, so that combinations of different membranes with different properties are also possible.

What is claimed is:

1. Inner lining for an item of equipment for at least temporary partial covering of body parts, comprising cut parts, joined together along edges to form connecting lines, each of the cut parts having at least one textile material layer and at least one semipermeable membrane layer joined together in a slip-proof and semipermeable manner over their entire common surfaces, the edges along the connecting lines between the membrane layers of adjacent cut parts being welded to each other, and the edges, along the connecting lines between the textile material layers of adjacent cut parts being joined together independently of the membrane layers.

2. Inner lining according to claim 1, wherein each cut part includes two of said textile material layers, with said membrane layer being disposed between said two textile layers, wherein all layers are joined together over their entire common surfaces in a slip-proof and semipermeable manner, said membrane layer and a second one of said two textile material layers being joined together along edges to form common connecting lines.

3. Inner lining according to claim 1, wherein at least one side of said semipermeably joined textile material layer and said membrane layer of each of said cut parts further includes an additional textile material layers, wherein the additional textile material layer is joined substantially over its entire surface in a slip-proof and semipermeable fashion with the semipermeably bonded textile material and membrane layers wherein edges of the additional textile material layer of each cut part being joined together independently of any membrane layers, by sewing to form additional connecting lines.

4. Inner lining according to claim 1, wherein said membrane layer and said textile material layer are joined together by a semipermeable adhesive layer.

5. Inner lining according to claim 1, further comprising at least two of said textile material layers being joined directly to one another over their common surfaces.

6. Inner lining according to claim 1, wherein said textile material layers of adjacent cut parts are joined together along said connecting lines by sewing.

7. Inner lining according to claim 2, wherein said edges along said common connecting lines between said membrane layer and said second textile material layer are sewn and welded.

8. Inner lining according to claim 2, wherein said edges along said common connecting lines between said membrane layer and said second textile material layer are sewn and heat-sealed.

9. Inner lining according to claim 2, wherein at least one side of said semipermeably-joined membrane layer and said two textile material layers of each of said cut parts further includes an additional textile material layer joined substantially over its entire surface in a slip-proof and semipermeable fashion with the semipermeable bonded membrane layer and said two textile material layers, wherein edges of the additional textile material layer of each cut part being joined independently of any membrane layers by sewing to form additional connecting lines.

10. Inner lining according to claim 4, wherein said adhesive layer is heat-activatable.

11. Inner lining according to claim 4, wherein said adhesive layer is pressure activatable.

12. Inner lining according to claim 4, wherein said adhesive layer comprises a plurality of dots of adhesive located on at least one of said membrane layer and said textile material layer.

13. Inner lining according to claim 1, wherein at least one side of said semipermeably joined textile material layer and said membrane layer of each of said cut parts further includes an additional semipermeable membrane layer, wherein the additional semipermeable membrane layer is joined substantially over its entire surface in a slip-proof and semipermeable fashion with the semipermeably bonded textile material and membrane layers, wherein adjacent edges of the additional semipermeable membrane layer of each cut part being joined together by welding to form additional connecting lines.

14. Inner lining according to claim 2, wherein at least one side of said semipermeably joined textile material layer and said membrane layer of each of said cut parts further includes an additional semipermeable membrane layer, wherein the additional semipermeable membrane layer is joined substantially over its entire surface in a slip-proof and semipermeable fashion with the semipermeably bonded textile material and membrane layers, wherein adjacent edges of the additional semipermeable membrane layer of each cut part being joined together by welding to form additional connecting lines.

15. Inner lining according to claim 3, wherein at least one side of said semipermeably joined textile material layer and said membrane layer of each of said cut parts further includes an additional semipermeable membrane layer, wherein the additional semipermeable membrane layer is joined substantially over its entire surface in a slip-proof and semipermeable fashion with the semipermeably bonded textile material and membrane layers, wherein adjacent edges of the additional semipermeable membrane layer of each cut part being joined together by welding to form additional connecting lines.

16. Inner lining according to claim 9, wherein at least one side of said semipermeably joined textile material layer and said membrane layer of each of said cut parts further includes an additional semipermeable membrane layer, wherein the additional semipermeable membrane layer is joined substantially over its entire surface in a slip-proof and semipermeable fashion with the semipermeably bonded textile material and membrane layers, wherein adjacent edges of the additional semipermeable membrane layer of each cut part being joined together by welding to form additional connecting lines.

17. Method for manufacturing an inner lining formed from a plurality of cut parts that are joined to each other, each cut part having at least one textile material layer and at least one semipermeable membrane layer that are joined together in a flush and semipermeable fashion, said method comprising:
  prior to joining said membrane layer and said textile material layer to one another in said flush and semipermeable fashion, cutting a membrane material and a textile material to form the membrane layers and the textile material layers for said layers for said plurality of cut parts;
  joining adjacent edges of adjacent membrane layers of said cut parts to one another by welding; and
  joining adjacent edges of adjacent textile material layers of said cut parts to one another by sewing.

18. Method according to claim 17, further comprising: before cutting said membrane material into the membrane layers for said plurality of cut parts, said membrane material is joined semipermeably over its entire common surface with a second textile material, whereupon said membrane material and said second textile material are cut jointly to form a conjoined membrane-textile layer for said plurality of cut parts, edges of said conjoined layer then being joined together with edges of adjacent conjoined layers of adjacent cut parts.

19. Method according to claim 17, wherein each cut part further includes an additional textile material layer having a shape cut to match the shape of said textile material layer.

20. Method according to claim 18, wherein said textile material having a shape cut to match the shape of the conjoined layer.

21. Method according to claim 18, wherein said conjoined layers of adjacent cut parts are joined together by sewing and welding.

22. Method according to claim 18, wherein said conjoined layers of adjacent cut parts are joined together by sewing and heat-sealing.

23. An item of equipment comprising:
  an inner lining having cut parts that are joined together along edges to form connecting lines, each of the cut parts having at least one textile material layer and at least one semipermeable membrane layer joined together in a slip-proof and semipermeable manner over their entire common surfaces, the edges along the connecting lines between the membrane layers of adjacent cut parts being welded to each other, and the edges along the connecting lines between the textile material layers of adjacent cut parts being joined together independently of the membrane layers by sewing;

said inner lining being joined to an inside surface of said item of equipment over substantially an entire outer surface of said inner lining in a semipermeable and slip-proof manner.

24. The item of equipment according to claim 23, wherein said inner lining is joined to the inside surface of said item of equipment by gluing.

25. The item of equipment according to claim 23, wherein said item of equipment is a glove.

* * * * *